United States Patent [19]

Crumbach et al.

[11] Patent Number: 5,075,139

[45] Date of Patent: Dec. 24, 1991

[54] COATING PROCESS FOR COATING TRANSPARENT PLASTIC COATINGS WITH A PIGMENTED FILTER STRIP

[75] Inventors: Richard Crumbach, Aachen; Otto Jandeleit, Alsdorf, both of Fed. Rep. of Germany

[73] Assignee: Saint-Gobain Vitrage International, Courbevoie, France

[21] Appl. No.: 680,141

[22] Filed: Apr. 3, 1991

Related U.S. Application Data

[62] Division of Ser. No. 534,283, Jun. 7, 1990.

[30] Foreign Application Priority Data

Jun. 24, 1989 [DE] Fed. Rep. of Germany ....... 3920774

[51] Int. Cl.$^5$ .......................... B05D 5/06; B05D 1/26; B05D 1/34
[52] U.S. Cl. .................................. 427/286; 427/163
[58] Field of Search ............... 427/286, 163; 118/411, 118/415, 419

[56] References Cited

U.S. PATENT DOCUMENTS

| 2,026,740 | 1/1936 | Kinsella et al. ...................... 425/466 |
| 3,398,431 | 8/1968 | Corbett ........................... 425/133.5 |
| 3,448,183 | 6/1969 | Chisholm ......................... 425/133.5 |
| 3,473,193 | 10/1969 | Quackenbush .................. 425/131.1 |
| 3,511,903 | 5/1970 | Glass et al. ....................... 425/131.1 |
| 3,886,898 | 6/1975 | Colegrove et al. ................. 118/411 |
| 4,272,312 | 6/1981 | Thompson ......................... 425/462 |
| 4,344,990 | 8/1982 | Wollam et al. .................... 427/286 |
| 4,356,217 | 10/1982 | Wollam et al. ................. 118/411 X |
| 4,476,165 | 10/1984 | Mc Intyre ....................... 118/411 X |
| 4,521,457 | 6/1985 | Russell et al. ...................... 427/286 |
| 4,619,802 | 10/1986 | Cloeren .............................. 425/462 |
| 4,731,004 | 3/1988 | Wenz ................................. 425/133.5 |
| 4,797,083 | 1/1989 | Riefenhäuser ..................... 425/466 |

FOREIGN PATENT DOCUMENTS 2614596 10/1977 Fed. Rep. of Germany .

OTHER PUBLICATIONS

Above German Ref. Cited by Applicant in Spec.

*Primary Examiner*—Evan Lawrence
*Attorney, Agent, or Firm*—Oblon, Spivak, McClelland, Maier & Neustadt

[57] ABSTRACT

A coating process for an apparatus for applying plastic coatings onto a planar substrate which includes an elongate coating head defining therein an elongate distribution channel having a length corresponding to a width of a substrate to be coated, the coating head also defining a coating gap for discharging a coating material from the distribution channel. First and second supply channels are respectively connected between respective pumps and different portions of the distribution channel for respectively supplying first and second coating materials to the distribution channel. A mixing zone is formed in the distribution channel by a partition or a hollow conical body, each of which forms a mixing gradient extending along the length of the mixing zone. Ideally, the pumps for the first and second coating materials provide these materials with the same pressure within the mixing zone.

7 Claims, 5 Drawing Sheets

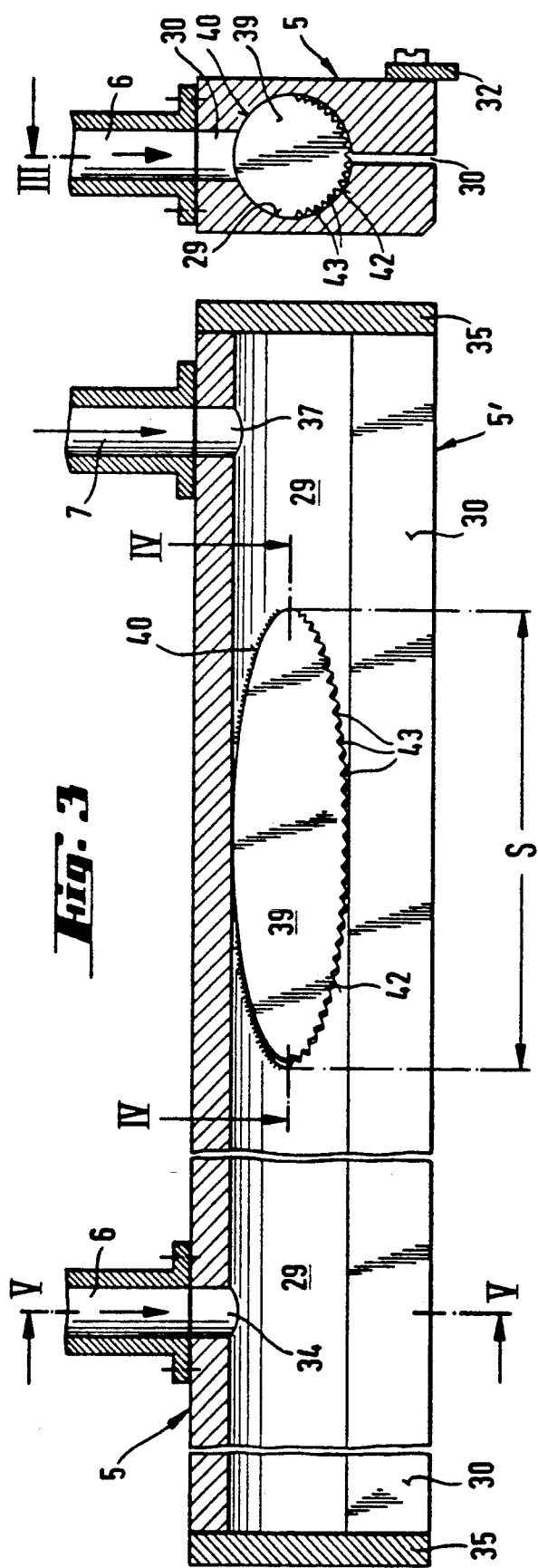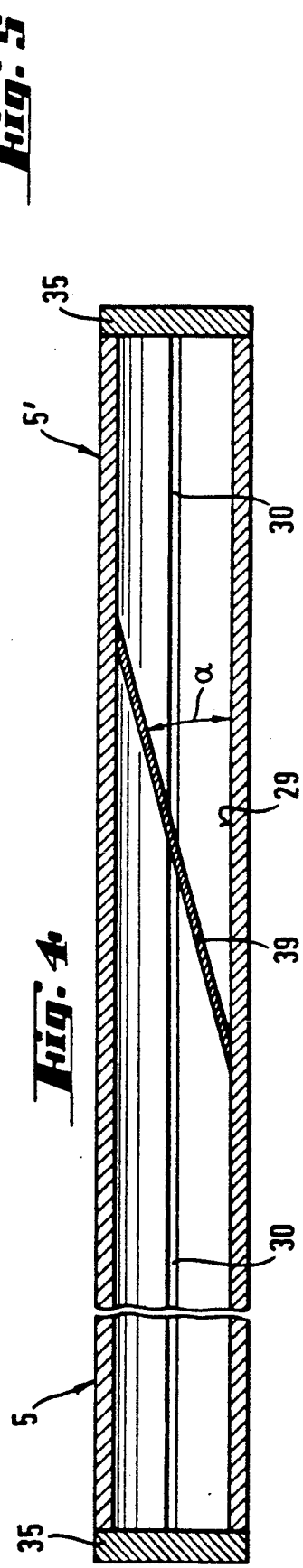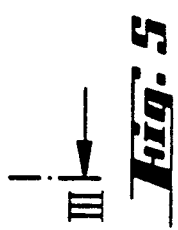

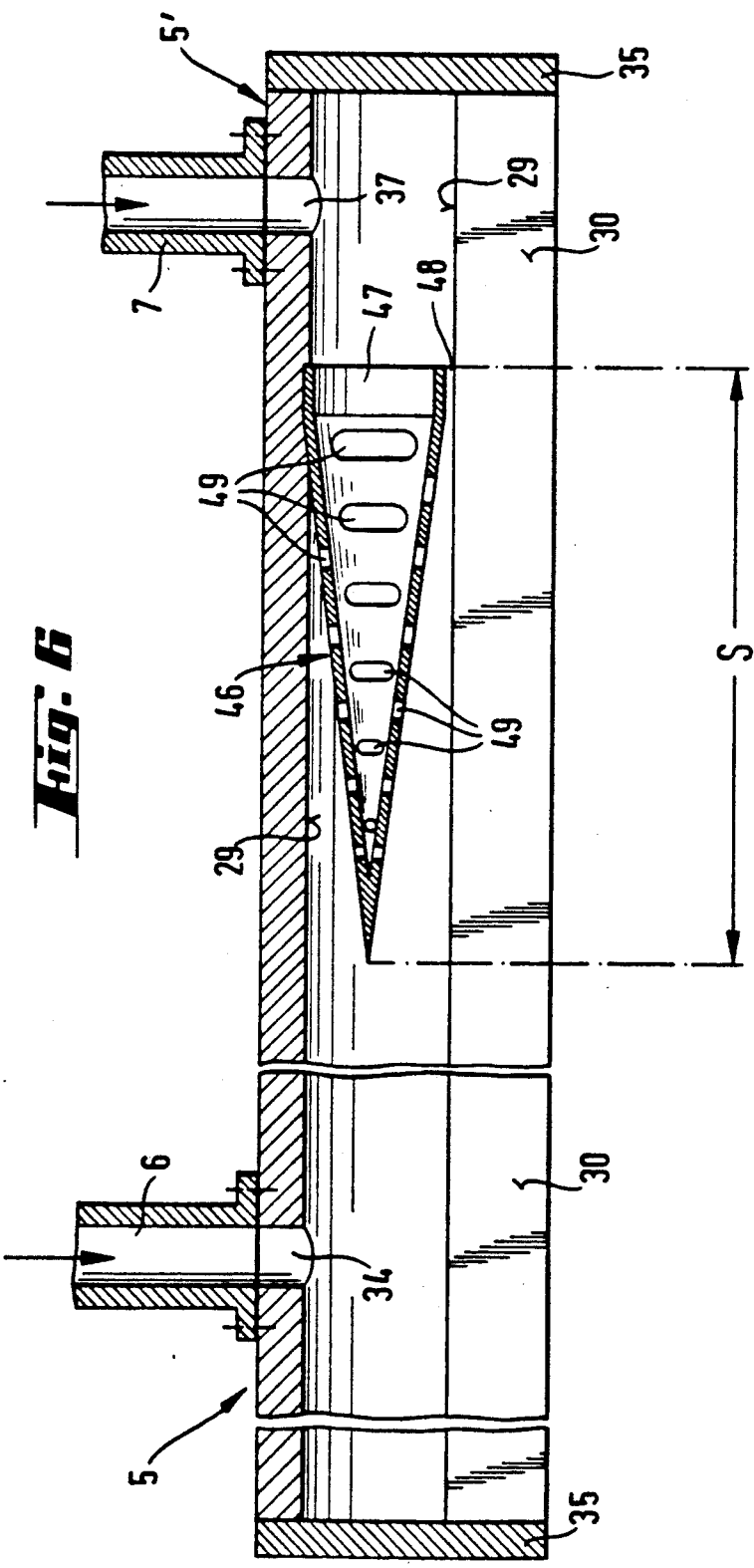

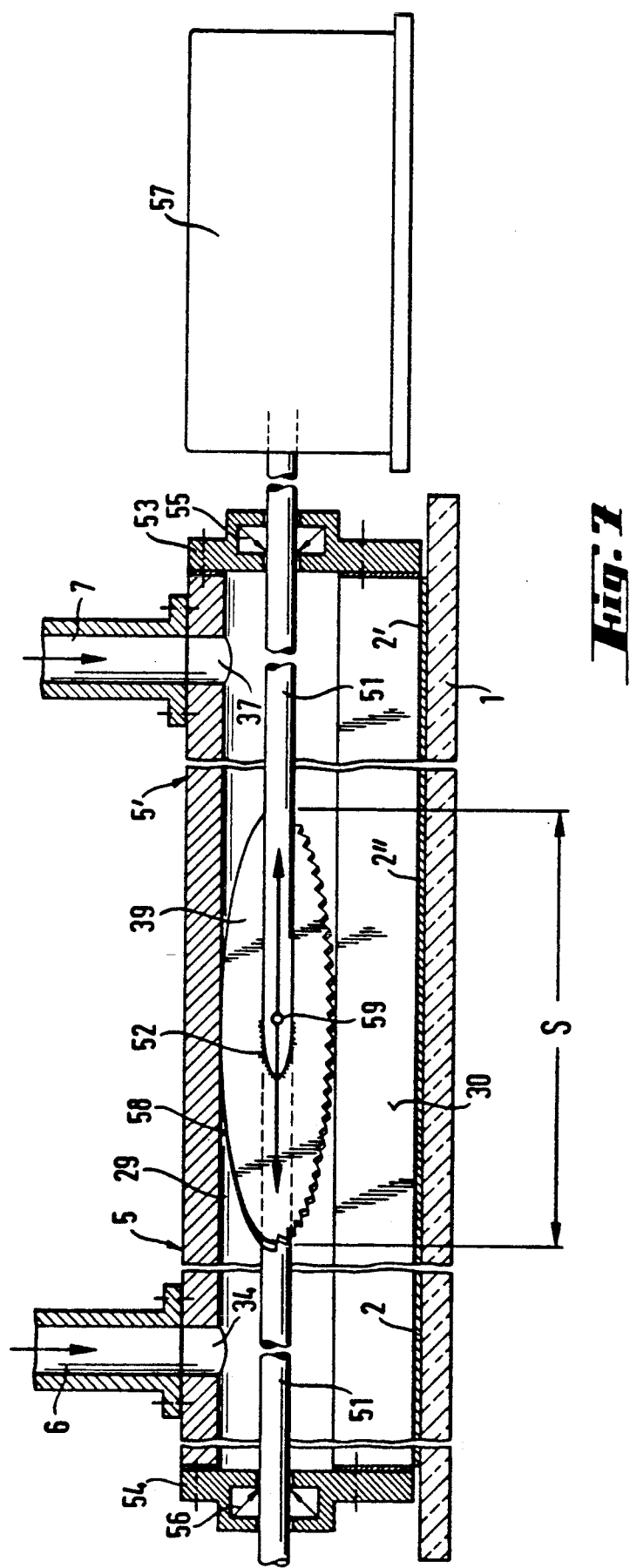

COATING PROCESS FOR COATING TRANSPARENT PLASTIC COATINGS WITH A PIGMENTED FILTER STRIP

This is a division of application Ser. No. 07/534,283, filed on June 7, 1990.

BACKGROUND OF THE INVENTION

1. Field of the Invention

The present invention relates to a coating process for applying plastic coatings on to planar substrates by use of a coating head having a distributing channel extending over the application width and which is provided with a supply channel issuing into the distributing channel and connected to a duct leading to a feed pump and a coating gap connected to the distributing channel.

2. Description of the Related Art

A coating head of this type is described in German Pat. No. 26 14 596. There, the coating gap connected to the distributing channel has a relatively small thickness and a relatively great length. Thus, the coating material is exposed to a high flow resistance in the coating gap. As a result, the static pressure of the coating material is the same at all points within the distributing channel, so that the coating material flows out of the entire width of the supply gap at the same speed and consequently dead areas in the system are avoided. As a result of this construction such a coating head is particularly suitable for producing homogeneous coatings and films made from highly transparent plastics, e.g., multicomponent reaction mixtures whose reaction begins within the coating head and in which dead areas in the system lead to striations in the transparent coating.

Preferred uses for such coating heads are as scraping coating heads in the production of coatings and films of highly transparent polyurethanes which can be used as intermediate coatings and/or splinterproof protection coatings for multilayer windscreens. The coating substrate for such coatings can either be the actual substrates to be provided with the coating, or other planar substrates from which, following the curing or complete hardening of the coating material, the cured coating is removed as a foil.

The upper edge of motor vehicle windscreens is often provided with a colored filter strip which reduces solar radiation. Generally this colored filter strip is located in the thermoplastic sheet interconnecting the two individual glass plates of a laminated glass plate. It can be produced by coloring the sheet or by a coextrusion of a colored plastic material and a colorless material. Between the colored strip and the colorless area there is provided a transition area, in which the transparency continuously changes over a distance of one to several centimeters, so that to a certain extent there is a gradual change to the filtering characteristics in this transition area. Government regulations require such a continuous transition area.

Whereas sheets or films or foils of thermoplastic material with a filter strip and a continuous transition area between the highly transparent area and the filter strip can be produced by known extruders, the production of coatings or films with a filter strip of reaction mixtures using a coating head has not hitherto been possible.

SUMMARY OF THE INVENTION

An object of the present invention is to provide a coating process comprising for a coating head of the aforementioned type, the production of plastic sheets or layers from a coating compound in such a way that it is also possible therewith to produce sheets or layers with a filter strip and a continuous transition zone between the filter strip and the highly transparent viewing area of the sheet or layer.

The coating process according to the invention includes the steps of producing relative movement between a planar substrate and an elongate coating head defining therein an elongate distribution channel having a length corresponding to a width of the substrate, the coating head having a coating gap communicating with the distribution channel, being positioned adjacent to the substrate and extending transverse to the direction of movement. A first coating material is supplied to one portion of the distribution channel. A second coating material is supplied to another portion of the distribution channel. The first and second coating materials are permitted to mix in a mixing zone of the distribution channel. The first and second materials and the mixed material are then discharged through the coating gap and onto the substrate. They form a coating of the first material on the substrate, a coating of the second material on the substrate and a coating of the mixed material between the coatings of the first and second materials.

It has been found that coatings or sheets with a filter strip and a gradual transition area can be produced with the aid of such a coating process. Particular significance is attached to the mixing zone in the distributing channel, which can be constructed in fundamentally different ways, provided that the flow cross-section for each of the two coating materials, considered in the length direction towards the other coating material, decreases in each case from a maximum area to a minimum area. Considerable significance is also attached to the precise control of the pressure of the feed pumps for the two different coating materials because even minor pressure differences lead to irregularities in the width and position of the transition zone. For example, in the case of pulsating pumps, it must be ensured that the piston movements of the pumps are in phase.

In order to bring about a completely satisfactory, continuous transition area between the filter strip and the highly transparent area, it is also important that the two coating materials be adequately mixed together. Optionally this can be ensured by adding suitable additives to one or both coating materials such that the parameters influencing the mixing characteristics, e.g., the surface tension of the coating materials, are so matched to one another that there is a homogeneous thorough mixing even over a relatively short mixing zone.

According to an advantageous further development of the invention, the mixing zone within the apparatus forming the distribution channel can be displaceable axially of said channel and a drive can be provided for bringing about a periodic reciprocating movement of said apparatus and therefore the mixing zone. It is possible in this way to give the interface between the two coating materials a configuration of, e.g., interconnected arcs. Thus, layers or sheets with filter strips can be produced, whose boundary line runs in arcuate manner parallel to the upper edge of the windscreen, which is generally desirable for aesthetic reasons.

The device according to the invention is used advantageously for the production of optical high-quality polyurethane layers used in laminated glazings and in particular in asymmetrical laminated glazings formed of a monolithic or laminated support and of a plastic sheet comprising at least one polyurethane layer as described, for example, in European patent publications EP 0 132 198, Ep 0 131 523, EP 0 133 090, EP 0 190 517.

These polyurethane layers obtained by reactive casting of a reactive mixture of two components, namely an isocyanate component and a polyol component, can be layers having energy-absorbing properties and/or scratch- and abrasion-resistant properties.

The reactive mixtures constituting the colored part of the layers according to the invention generally are formed from the same components as the noncolored part, the only difference being the addition to their composition of suitable coloring agents.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows a longitudinal sectional view of a first embodiment of a coating head;

FIG. 4 is a sectional view along line IV—IV in FIG. 3;

FIG. 5 is a sectional view along line V—V in FIG. 3;

FIG. 6 corresponds to FIG. 3 but shows another embodiment of a coating head; and FIG. 7 shows an embodiment of a coating head in which the position of the mixing zone is axially displaceable.

DETAILED DESCRIPTION OF THE PREFERRED EMBODIMENTS

Figure 1:
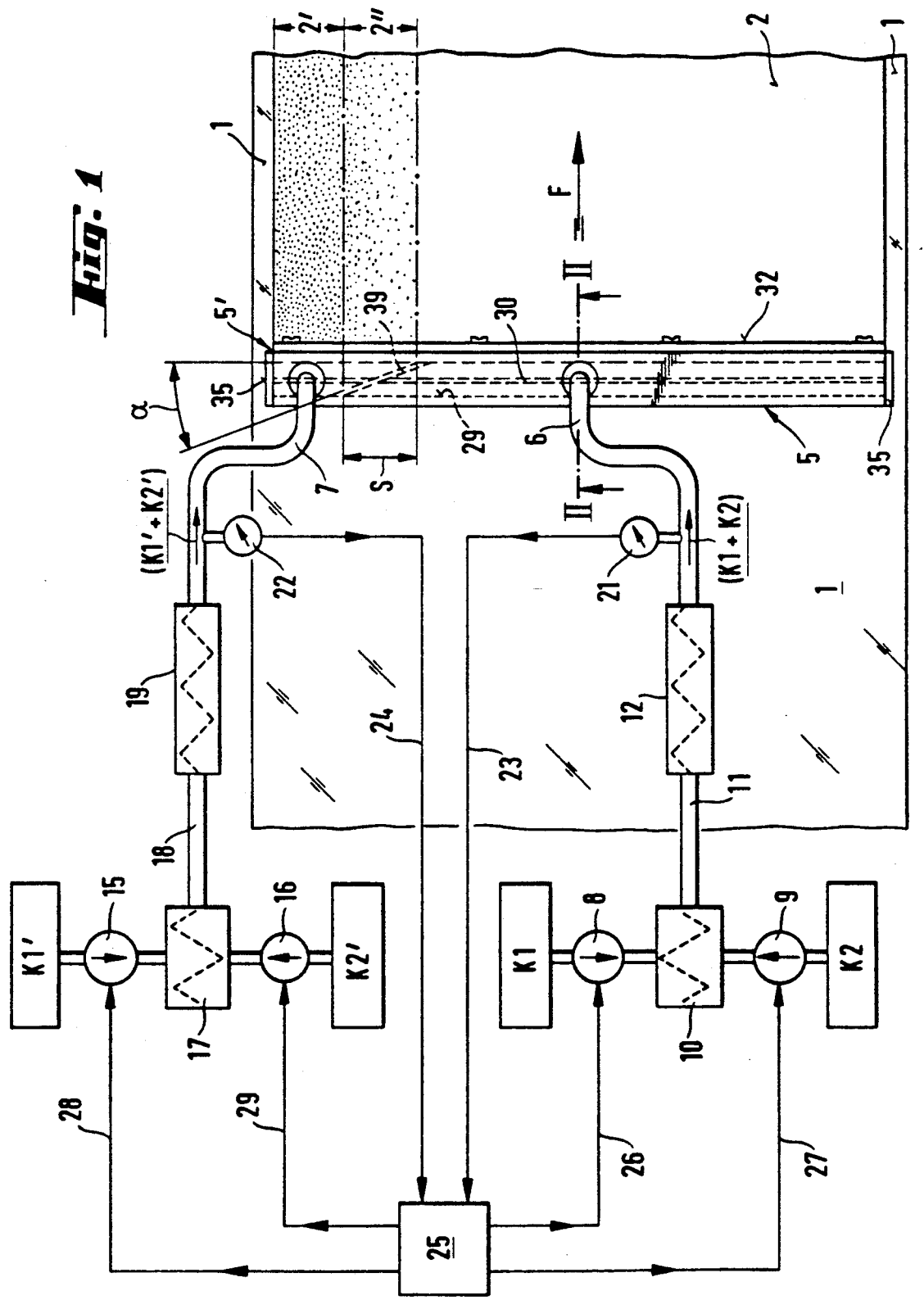
FIG. 1 schematically shows a coating apparatus according to the invention during the coating of a coating substrate.

With the aid of the coating apparatus shown in FIG. 1 a coating 2 of a reaction coating material or compound is coated on to a planar coating substrate 1. In its marginal area 2', the coating 2 consists of a pigmented coating material with a homogeneous, constant transparency and color. In the transition area 2", there is a continuous increase in between the marginal area 21 and the area where the coating is clear the transparency with distance away from marginal area 2', so that there is a decreasing absorption and filtering action in said transition area 2".

In the present case a film or sheet is produced, so that the coating 2 may be drawn off the coating substrate 1 following curing. The film or coating 2 is formed from a polyurethane obtained by reacting a polyol component (component K1) and an isocyanate component (component K2).

The coating head 5 is used for applying the coating material to the coating substrate 1. The coating head 5 is provided with a central connecting duct 6 through which the highly transparent coating material (K1+K2) is introduced into the coating head 5. The end portion 5' of the coating head 5 is provided with a further connecting duct 7 which is used for supplying the pigmented coating material (K1'+K2') which is required for forming the colored marginal area 2'.

The coating material fed to the duct 6 and that fed to the duct 7 are in each case separately prepared. For the preparation of the highly transparent coating material fed by duct 6 to coating head 5, component K1 is pumped by the pump 8 and the component K2 by the pump 9 to the mixing head 10. From the mixing head 10 the reaction mixture passes through the duct 11 to a further mixer 12 to which is connected the duct 6.

In the same way, the component K1' forming the coating compound for the colored marginal area 2' is supplied by a pump 15 and the component K2' by a pump 16 to a mixing head 17. From the latter the reaction coating material passes through the duct 18 to the mixer 19 to which is connected the duct 7.

A manometer 21 is connected to the duct 6 and a manometer 22 to the duct 7. By means of the signal lines 23 or 24 the actual values of the pressure prevailing in the two ducts 6, 7 are passed to the control unit 25, where the effective pressures are continuously compared For example, the control unit can be a microcomputer including electropneumatic pressure transducers for converting pressure signals from the manometer to electric signals By means of the control lines 26, 27, 28, and 29 the pumps 8, 9, 15 and 16 are controlled so that the pressures prevailing in the ducts 6 and 7 are always precisely the same. For example, the pumps may be driven by variable speed electric motors whose speeds are controlled by the control unit 25. If the pumps 8, 9, 15 and 16 are pulsating pumps, e.g., piston pumps, the control unit 25 also ensures that the periodic pressure fluctuations of the individual pumps due to their pulsation always occur in an in phase manner, so that the corresponding periodic pressure fluctuations in the ducts 6 and 7 have no reciprocal phase displacement.

Figure 2:
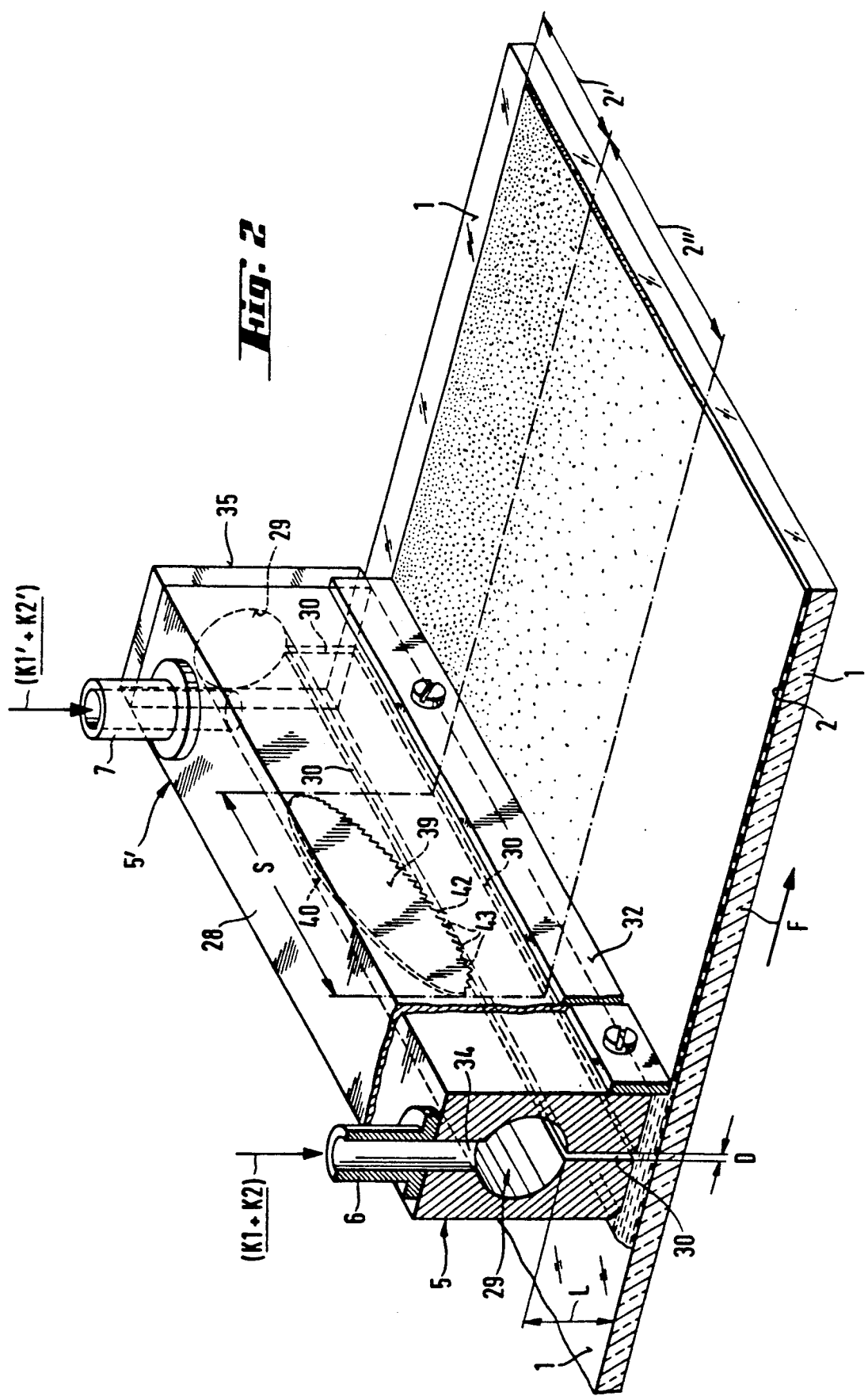
FIG. 2 is an enlarged sectional view along line II—II in FIG. 1.

The fundamental construction of the coating head 5 can be seen from FIG. 2. Coating head 5 essentially comprises a metal body 28 within which extends a bore in the longitudinal direction, and which bore acts as a distributing channel 29, to which is connected the coating gap 30. The coating gap 30 has a length L of 10 to 100 mm and a thickness D of 0.1 to 0.5 mm. The straight edge 32 is fixed to the metal body 28 so that the coating head can perform scraping Below the coating head 5 the coating substrate 1 is moved at a constant speed in the direction of arrow F.

The central (first) supply channel 34 issues into the distributing channel 29 in the center of the metal body 28. The supply duct 6 is flanged to the metal body 28 and supplies the distributing channel 29 with the coating material through the supply channel 34. The supply duct 7, which supplies the distributing channel 29 at one end of the coating head with the colored coating material is also flanged to the metal body 28. On the end faces, stop plates 35 are screwed to the metal body 28 and seal off the distributing channel 29 and the gap 30 on all sides.

As can be seen in detail in FIGS. 3 to 5, within the distributing channel 29 between the second supply channel 37 to which is connected the duct 7 for the colored coating material, and the central supply channel 34 to which is connected the duct 6, there is a mixing zone S in which a continuous transition is formed between the two different coating materials, i.e., where the two coating materials mix in such a way that the desired continuous transition is obtained.

For this purpose, within the distributing channel 29 is arranged in an inclined manner a planar partition 39 in the form of an elliptical disk which is oriented in such a way that the flow cross-section continuously decreases on one side of said partition 39, while the flow cross-section on the other side thereof continuously increases to the same extent. The partition 39 arranged in the cross-sectionally circular distributing channel 29 extends vertically and is at an angle alpha to the axial direction of the distributing channel 29.

The angle alpha is derived from the desired length of the mixing zone S, which defines the transition area between the two coating materials. Along the upper part 40 of its circumferential surface, i.e., in the zone in which it engages on the upper half of the distributing channel 29, the partition 39 is sealed against the wall of the distributing channel and is, e.g., is welded thereto. The lower circumferential part 42 of the partition 39 has no connection to the wall of the distributing channel 29 and is serrated to define a plurality of gaps 43 between the wall of distributing channel 29 and the partition 39, through which the coating materials pass and in each case mix with the coating material located on the other side of the partition 39.

The optimum size of each of the gaps 43 is a function of the viscosity of the coating materials and can be determined by tests.

Another possible embodiment for the mixing zone in the distributing channel 29 is shown in FIG. 6. In this case a conical hollow body 46 is arranged within the distributing channel 29 and its base is directed towards that side which is subject to the action of the colored coating material by the supply channel 37. The base part 47 of the conical hollow body 46 is tightly connected to the wall of the distributing channel 29, but the base part 47 is flattened in the area adjacent to the gap 30, so that the transition from the distributing channel 29 to the gap 30 is not interrupted. The opening 48 formed in this way consequently permits the passage of the coating material. In the wall of the conical hollow body 46 is provided a row of passage openings 49, whose cross-section decreases towards the cone apex of the hollow body 46.

The colored coating material passes out through the openings 49 and penetrates a colorless coating material located outside the conical hollow body and mixes therewith, so that in this way the desired continuous transition between the two coating materials is obtained.

In the case of the embodiment shown in FIG. 6, in certain circumstances in the vicinity of the mixing zone S, the flow resistance for the two different coating materials may differ as a function of the chosen dimensions of the passage openings. However, since for a uniform, thorough mixing the same hydrostatic pressure of the two coating materials in the mixing zone constitutes a prerequisite, it may be necessary to increase the pressure in one of the two ducts 6 or 7 in order to compensate for the pressure drop caused by the unequal flow resistance.

FIG. 7 shows a modification of the first described coating head, which differs therefrom in that the partition 39 within the distributing channel 29 is mounted so as to be axially displaceable therein. For this purpose the elliptical partition 39 is fixed to an adjusting rod 51, e.g., by a weld 52. The adjusting rod 51 is displaceably mounted in the lateral stop plates 53, 54, the seals 55 and 56 ensuring the tight termination of the distributing channel 29. The drive means 57, e.g., a solenoid, gives the adjusting rod 51 and therefore the partition 39 the desired axial displacement movement along the double arrow 59, while the sliding face 58 of the partition 39 in the upper half of the distributing channel 29 bears against the wall of the latter.

If the drive 57, e.g., ensures a periodic reciprocating movement of the partition 39, it is possible to obtain a wavy path of the separating line between the colored and the highly transparent part of the coated layer. In addition, drive 57 can cause a periodic movement of the partition 39, which leads to a succession of arcuate separating lines and transition zones between the colored strip and the highly transparent part of the coated layer. This makes it possible to obtain colored filter strips with a curved configuration of the transition zone, as are frequently used in the case of motor vehicle windscreens.

Obviously, numerous modifications and variations of the present invention are possible in light of the above teachings. It is therefore to be understood that within the scope of the appended claims, the invention may be practiced otherwise than as specifically described herein.

WHAT IS CLAIMED AS NEW AND DESIRED TO BE SECURED BY LETTERS PATENT OF THE U.S. IS:

1. A process for applying plastic coatings onto planar substrates, comprising the steps of:
   producing relative movement between a planar substrate and an elongate coating head defining therein an elongate distribution channel having a length corresponding to a width of the substrate, the coating head having a coating gap communicating with the distribution channel, being positioned adjacent the substrate and extending transverse to the direction of movement;
   supplying a first coating material to one portion of the distribution channel;
   supplying a second coating material to another portion of the distribution channels;
   permitting said first and second coating materials to mix in a mixing zone of said distribution channel; and
   discharging said first and second materials from said one portion, said another portion and said mixing zone, said first and second materials and a mixture of the first and second materials being discharged through said coating gap and onto the substrate so as to form a coating of the first material on the substrate, a coating of the second material on the substrate and a coating of the mixture between the coatings of the first and second materials.

2. The process of claim 1 wherein said step of permitting said first and second coating materials to mix comprises permitting said materials to mix such that a concentration of the first material in the mixture progressively decreases in a direction away from the one portion of the channel, and a concentration of the second coating material in the mixture progressively decreases in a direction away from the another portion of the channel.

3. The process of claim 1 further including the step of equalizing the pressures of the first and second coating materials being supplied to the channel.

4. The process of claim 1 in which the first material has energy absorbing properties and the second material is pigmented, so that the mixture is pigmented and has energy absorbing properties.

5. The process of claim 11 wherein the first coating material has scratch and abrasion resistant properties and the second coating material is pigmented so that the mixture is pigmented and has scratch and abrasion resistant properties.

6. The process of claim 2 in which the first material has energy absorbing properties and the second material is pigmented, so that the mixture is pigmented and has energy absorbing properties.

7. The process of claim 16 wherein the first coating material has scratch and abrasion resistant properties and the second coating material is pigmented so that the mixture is pigmented and has scratch and abrasion resistant properties.

* * * * *